US007961968B2

(12) United States Patent
Hara

(10) Patent No.: US 7,961,968 B2

(45) Date of Patent: Jun. 14, 2011

(54) IMAGE DENSITY CONVERSION METHOD, IMAGE ENHANCEMENT PROCESSOR, AND PROGRAM THEREOF

(75) Inventor: Masanori Hara, Tokyo (JP)

(73) Assignee: NEC Corporation, Tokyo (JP)

( * ) Notice: Subject to any disclaimer, the term of this patent is extended or adjusted under 35 U.S.C. 154(b) by 956 days.

(21) Appl. No.: 11/842,686

(22) Filed: Aug. 21, 2007

(65) Prior Publication Data

US 2008/0050030 A1 Feb. 28, 2008

(30) Foreign Application Priority Data

Aug. 25, 2006 (JP) ................................ 2006-229841

(51) Int. Cl.
*G06K 9/40* (2006.01)
*H04N 1/40* (2006.01)

(52) U.S. Cl. ....................................... 382/254; 358/448

(58) Field of Classification Search .................. 382/169, 382/254, 274, 305, 312; 358/448, 451, 452, 358/461, 454–455, 463, 521–522; 348/672, 348/671

See application file for complete search history.

(56) References Cited

U.S. PATENT DOCUMENTS

| | | | | |
|---|---|---|---|---|
| 4,827,352 | A * | 5/1989 | Yoneda et al. | 358/3.07 |
| 5,130,808 | A * | 7/1992 | Kemmochi | 358/1.9 |
| 5,243,440 | A * | 9/1993 | Hashimoto | 358/448 |
| 5,426,684 | A | 6/1995 | Gaborski et al. | |
| 5,475,493 | A * | 12/1995 | Yamana | 356/404 |
| 6,289,137 | B1 * | 9/2001 | Sugiyama et al. | 382/299 |
| 6,631,209 | B1 * | 10/2003 | Kanamori | 382/169 |

FOREIGN PATENT DOCUMENTS

| | | | |
|---|---|---|---|
| DE | 102007035884 | A1 | 7/2008 |
| JP | 03-69231 | A | 3/1991 |
| JP | 60-31362 | A | 2/1994 |
| JP | 08-186704 | A | 7/1996 |
| JP | 2001-118062 | A | 4/2001 |
| JP | 3465226 | B2 | 8/2003 |
| JP | 2006-519447 | A | 8/2006 |
| WO | 2004/079655 | A2 | 9/2004 |

* cited by examiner

*Primary Examiner* — Kanji Patel

(74) *Attorney, Agent, or Firm* — Sughrue Mion, PLLC

(57) ABSTRACT

Areas, allowed to overlap, are set for respective pixels in an image, and a maximum density value and a minimum density value, among inherent density values of the pixels in each area, are extracted and specified as maximum and minimum density values common to the pixels in the area. Among the density values specified from the overlapping areas, the largest minimum density value is set as a local minimum value and the smallest maximum density value is set as a local maximum value to thereby generate a minimum density plane and a maximum density plane including the pixels having the values. The density values of the pixels at the corresponding positions in the minimum density plane and the maximum density plane are corresponded to the common minimum and maximum values set separately, to thereby linearly convert the whole. Thereby, the pixel density values of the original image are linearly converted simultaneously.

15 Claims, 10 Drawing Sheets

RELATED ART

RELATED ART

RELATED ART

MINIMUM DENSITY PLANE

MAXIMUM DENSITY PLANE

IMAGE ENHANCEMENT EXAMPLE OF PRESENT INVENTION

PROFILE NEAR BACKGROUND NOISE AREA BOUNDARY IN ENHANCED IMAGE

IMAGE DENSITY CONVERSION METHOD, IMAGE ENHANCEMENT PROCESSOR, AND PROGRAM THEREOF

BACKGROUND OF THE INVENTION

1. Field of the invention

This application is based upon and claims the benefit of priority from Japanese patent application No. 2006-229841, filed on Aug. 25, 2006, the disclosure of which is incorporated herein in its entirety by reference.

The present invention relates to a method of enhancing the texture of input images such as latent fingerprint images and palm print images including uneven density and background noises.

2. Related Art

Generally, a fingerprint configured of a plurality of streak pattern ridges has two main characteristics, which are eternal and unique, so it has been used as a means for crime investigation. In particular, fingerprint matching using latent fingerprints remained in a crime scene is an effective means for investigation. In recent years, a fingerprint matching system using computers has been introduced, and latent fingerprint matching is conducted in various police agencies.

However, a latent fingerprint image is often unclear since it has low quality and includes noises, so examination carried out by an examiner is not easy. Further, this causes a major disincentive for automation. FIG. 5 shows an example illustrating a digitalized latent fingerprint remained on a check. As shown in this example, the background densities in an area including background noises such as characters and patterns of the check and in an area without background noises of this kind are largely different. Thereby, the dynamic ranges of fingerprint ridges are extremely different.

FIG. 6 shows a profile of an image on a line L, which is an enlarged part near the background noise area boundary of the image shown in FIG. 5. In FIG. 6, it is found that the dynamic range of a fingerprint ridge on the background noise caused by a character is extremely smaller compared with the dynamic range of a fingerprint ridge in an area with no noise.

As the latent fingerprint shown in this example, even applying a related image enhancement method to an image in which the dynamic range of the target texture (fingerprint ridge) drastically changes in continuing areas, it is difficult to enhance only the target texture (fingerprint ridge) because the noise area boundary is enhanced.

Even applying the Adaptive Contrast Stretch or the Adaptive Histogram Equalization, which is a typical related image enhancement method, to the input image shown in FIG. 7A, an adverse effect that the background noise area boundary is enhanced too much as shown in FIG. 7B or the background noise area cannot be removed completely as shown in FIG. 7C is caused.

Various methods have been proposed to solve such a problem. For instance, Japanese Patent No. 3465226 (Patent Document 1) discloses an image density conversion method in which an input image is divided into areas based on the texture analysis, and smoothing level of the density histogram is determined for each area according to the size of the dynamic range, to thereby suppress elimination of useful information.

Further, U.S. Pat. No. 5,426,684, "Technique for finding the histogram region of interest for improved tone scale reproduction of digital radiographic images", by Gaborski et al. (Patent Document 2) discloses an area dividing method using a neural network to determine appropriate reference areas.

However, in Patent Document 1, a certain appropriate reference area is provided around a target pixel and density conversion is performed based on the density histogram of the pixels included in the area. Therefore, an adverse effect that the background noise area is enhanced too much as shown in FIG. 7B or the background noise area cannot be removed completely as shown in FIG. 7C, described above, is not solved.

Further, even in the area dividing method using a neural network, it causes the same adverse effect that the background noise area cannot be removed completely, as the case of Patent Document 1.

Further, the density conversion method described in Patent Document 1 uses an area dividing method based on the texture analysis of an input image. Therefore, the method largely depends on the analysis accuracy, which causes such an adverse effect that the enhancement result will be deteriorated if area division is not processed as expected.

The problem caused in the related art is that even applying a related image enhancement method to an image in which the dynamic range of a target texture (fingerprint ridge) changes drastically and extremely in continuing areas or to an image in which a texture exists on areas where the densities are extremely different, it is difficult to enhance only the target texture because the noise area boundary is also enhanced.

Further, the related art also involves a shortcoming that if a reference area lies astride the boundary between a background noise area and an area without background noise near the background noise boundary, the density histogram is not always taken from the area where the target pixel belongs to, so the noise area boundary may be enhanced.

In view of the above, art capable of enhancing only a target texture, even in an image where the dynamic range of the target texture changes drastically and extremely in continuing areas, has been demanded.

SUMMARY OF THE INVENTION

It is an exemplary object of the present invention to provide an image conversion method capable of performing image enhancement to an input image so as to enhance the texture such as a latent fingerprint image which is targeted and desired to be enhanced, and preventing the boundary of background noise area from being enhanced, while solving the inconveniences involved in the example of the related art.

In order to achieve the object, an image density conversion method according to an exemplary aspect of the present invention includes the steps of: setting at least two image planes each of which includes a plurality of pixels of the same number as the pixels included in an input image; setting, for respective pixels of the input image, pixel areas each having a certain size around the pixels respectively, respective pixel areas partially overlapping each other, extracting a maximum density value and a minimum density value from a plurality of pixels in one pixel area among the pixel areas set, and specifying the maximum density value and the minimum density value as a maximum density value and a minimum density value which are common to the pixels in the pixel area; storing the specified maximum density value and the specified minimum density value of the pixels of the pixel area in the two pixel planes separately, while corresponding the positions of respective pixels in the two pixel planes with each other, to thereby generate a maximum density plane and a minimum density plane; following the extraction of the maximum density value and the minimum density value in the one pixel area, sequentially extracting a maximum density value and a minimum density value in another pixel area, and if the maximum density value extracted is smaller than a maximum density value of the same pixel in an overlapping area previously set, replacing the density value of the same pixel in the maximum density plane with the smaller density value so as to set the smaller density value to be a local maximum value, and if the minimum density value extracted is larger than a minimum density value of the same pixel in an overlapping area previously set, replacing the density value of the same pixel in the minimum density plane with the larger density value so as to set the larger density value to be a local minimum value; converting the generated local minimum value and local maximum value of the corresponding pixels in the maximum density plane and in the minimum density plane and the original density value of the input image in the respective pixel at the corresponding positions thereto, into the common minimum value and the common maximum value previously set corresponding to the local minimum value and the local maximum value of the pixels, while maintaining the relative ratio of the densities for the pixels, and linearly converting the original density values of the pixels in the input image; and reconstructing the input image based on the linearly converted density values of the pixels.

Thereby, since the minimum density value and the maximum density value extracted from a set pixel area can be confirmed, the extracted density values can be set to optimum values, and a local minimum value and a local maximum value which are optimum for image enhancement processing can be specified from the set pixel area.

Further, an image density conversion method according to an exemplary aspect of the present invention includes the steps of: setting, for respective pixels of an input image, pixel areas each having a certain size around the pixels respectively, the respective pixel areas partially overlapping each other, extracting a maximum density value and a minimum density value from a plurality of pixels in one pixel area among the pixel areas, and specifying the maximum density value and the minimum density value as a maximum density value and a minimum density value which are common to the pixels in the pixel area; following the extraction of the maximum density value and the minimum density value in the one pixel area, sequentially extracting a maximum density value and a minimum density value in another pixel area, and if the maximum density value extracted is smaller than a maximum density value of the same pixel in an overlapping area previously set, replacing the density value of the same pixel with the smaller density value extracted so as to set the smaller density value to be a local maximum value, and at the same time, if the minimum density value extracted is larger than the minimum density value of the same pixel in an overlapping area previously set, replacing the density value of the same pixel with the larger density value extracted so as to set the larger density value to be a local minimum value; converting the local minimum value and local maximum value, generated by replacement, of the pixels and the original density value of the input image in the respective pixel to a common minimum value and a common maximum value previously set corresponding to the local minimum value and the local maximum value of the pixels, while maintaining the relative ratio of the densities for the pixels, and linearly converting the original density values of the pixels in the input image; and reconstructing the input image based on the linearly converted density values of the pixels.

Even with this configuration, a local minimum value and a local maximum value which are optimum for image enhancement processing can be specified from the set pixel area.

Further, an image density conversion method according to an exemplary aspect of the present invention includes the steps of: setting, for respective pixels of an input image, pixel areas having a certain size around the pixels respectively, the pixel areas partially overlapping each other, extracting a maximum density value and a minimum density value of pixels for each of the pixel areas set, and specifying the maximum density value and the minimum density value as a maximum density value and a minimum density value which are common to the pixels in the pixel area; if each pixel has a plurality of maximum density values and minimum density values specified corresponding to the respective areas, specifying the smallest value among the maximum density values as a local maximum value, and specifying the largest value among the minimum density values as a local minimum value; converting the specified local minimum value and local maximum value of the pixels and the original density value of the input image in the respective pixel into a common minimum value and a common maximum value respectively, which are set separately and common to the pixels, to make them common values, while maintaining the relative ratio of the densities for the pixels, and linearly converting the original density values of the pixels in the input image simultaneously; and reconstructing the input image based on the linearly converted density values of the pixels.

Even with this configuration, a local minimum value and a local maximum value which are optimum for image enhancement processing can be specified from the set pixel area, same as the case described above.

An image enhancement processor according to an exemplary aspect of the present invention includes: an image plane setting unit that sets at least two image planes each of which includes a plurality of pixels of a number same as that of pixels included in an input image; a maximum/minimum density value specifying unit that sets, for respective pixels of the input image, pixel areas each having a certain size around the pixels respectively, the pixel areas partially overlapping each other, extracts a maximum density value and a minimum density value from a plurality of pixels in one pixel area among the pixel areas, and specifies the maximum density value and the minimum density value as a maximum density value and a minimum density value which are common to the pixels in the pixel area; a maximum/minimum density image generating unit that stores the specified maximum density value and the specified minimum density value of the pixels in the pixel area in the two pixel planes separately, while corresponding the positions of the respective pixels in the two pixel planes with each other, to thereby generate a maximum density plane and a minimum density plane; a density value replacing and setting unit that, following the extraction of the maximum density value and the minimum density value in the one pixel area, sequentially extracts a maximum density value and a minimum density value in another pixel area, and if the maximum density value extracted is smaller than a maximum density value of the same pixel in an overlapping area previously specified, replaces the density value of the same pixel in the maximum density plane with the smaller density value extracted so as to set the smaller density value to be a local maximum value, and at the same time, if the minimum density value extracted is larger than a minimum density value of the same pixel in an overlapping area previously specified, replaces the density value of the same pixel in the minimum density plane with the larger density value extracted so as to set the larger density value to be a local minimum value; a density value conversion control unit that linearly converts the local minimum value and local maximum value, generated by replacement at the density value replacing and setting unit, of corresponding pixels in the maximum density plane and in the minimum density plane and the original density value of the input image in the respective pixel at the corresponding positions thereto, into the common minimum value and the common maximum value set previously corresponding to the local minimum value and the local maximum value of the pixels, while maintaining the relative ratio of the densities for the pixels, and linearly converts the original density values of the pixels in the input image; and an image density conversion control unit that replaces the density values of the pixels, which are linearly converted by the density value conversion control unit, with the density values of the corresponding pixels of the input image to thereby reconstruct the input image.

Even with this configuration, the minimum density values and the maximum density values extracted from the set pixel area can be confirmed. Therefore, the extracted density values can be set to be the optimum values, and further, a local minimum value and a local maximum value which are optimum for image enhancement processing can be specified from the set pixel area.

Further, an image enhancement processor according to an exemplary aspect of the present invention includes: a maximum/minimum density value specifying unit that sets, for respective pixels of the input image, pixel areas each having a certain size around the pixels respectively, the pixel areas partially overlapping each other, extracts a maximum density value and a minimum density value from a plurality of pixels in one pixel area among the pixel areas set, and specifies and stores the maximum density value and the minimum density value as a maximum density value and a minimum density value which are common to the pixels in the pixel area; a density value replacing and setting unit that, following the extraction of the maximum density value and the minimum density value in the one pixel area, sequentially extracts a maximum density value and a minimum density value in another pixel area, and if the maximum density value extracted is smaller than a maximum density value of the same pixel in an overlapping area previously specified, replaces the density value of the same pixel in the maximum density plane with the smaller density value extracted so as to set the smaller density value to be a local maximum value, and at the same time, if the minimum density value extracted is larger than a minimum density value of the same pixel in an overlapping area previously specified, replaces the density value of the same pixel with the larger density value extracted so as to set the larger density value to be a local minimum value; a density value conversion setting unit that converts the local minimum value and the local maximum value, generated by replacement at the density value replacing and setting unit, and the original density value of the input image in the respective pixel into the common minimum value and the common maximum value set previously corresponding to the local minimum value and the local maximum value of the pixels, while maintaining the relative ratio of the densities for the pixels, and linearly converts the original density values in the input image; and an image density conversion control unit that replaces the density values of the pixels, which are linearly converted by the density value conversion control unit, with the density values of the corresponding pixels of the input image to thereby reconstruct the input image.

Even with this configuration, a local minimum value and a local maximum value which are optimum for image enhancement processing can be specified from the set pixel area, same as the case described above.

Further, an image enhancement processor according to an exemplary aspect of the present invention includes: a maximum/minimum density value extracting unit that sets, for respective pixels of an input image, pixel areas having a certain size around the pixels respectively, the pixel areas partially overlapping each other, extracts a maximum density value and a minimum density value of the pixels for each of the pixel areas set, and specifies and stores the maximum density value and the minimum density value as a maximum density value and a minimum density value which are common to the pixels in the pixel area; a local density value specifying unit that, if each pixel has a plurality of maximum density values and minimum density values specified corresponding to the respective areas, specifies the smallest value among the maximum density values as a local maximum value, and specifies the largest value among the minimum density values as a local minimum value; a density value conversion setting unit that converts the specified local minimum value and local maximum value of the pixels and the original density value of the input image in the respective pixel into a common minimum value and a common maximum value respectively, which are set separately and common to the pixels, to make them common values, while maintaining the relative ratio of the densities for the pixels, and linearly converts the original density values of the pixels in the input image simultaneously; and an image density conversion control unit that replaces the density values of the pixels, which are linearly converted by the density value conversion control unit, with the density values of the corresponding pixels of the input image to thereby reconstruct the input image.

Even with this configuration, a local minimum value and a local maximum value which are optimum for image enhancement processing can be specified from the set pixel area, same as the case described above.

An image enhancement processing program according to an exemplary aspect of the present invention is adapted to cause a computer to execute: an image plane setting function to set at least two image planes each of which includes a plurality of pixels of the same number as the pixels included in an input image; a maximum/minimum density value specifying function to set, for respective pixels of the input image, pixel areas each having a certain size around the pixels respectively, the pixel areas partially overlapping each other, extract a maximum density value and a minimum density value from a plurality of pixels in one pixel area among the pixel areas set, and specify and store the maximum density value and the minimum density value as a maximum density value and a minimum density value which are common to the pixels in the pixel area; a maximum/minimum density image generating function to store the specified maximum density value and the specified minimum density value of the pixels in the pixel area in the two pixel planes separately, while corresponding the positions of respective pixels in the two pixel planes with each other, to thereby generate a maximum density plane and a minimum density plane; a density value replacing and setting function to, following the extraction of the maximum density value and the minimum density value in the one pixel area, sequentially extract a maximum density value and a minimum density value in another pixel area, and if the maximum density value extracted is smaller than a maximum density value of the same pixel in an overlapping area previously specified, replace the density value of the same pixel in the maximum density plane with the smaller density value extracted so as to set the smaller density value to be a local maximum value, and at the same time, if the minimum density value extracted is larger than a minimum density value of the same pixel in an overlapping area previously specified, replace the density value of the same pixel in the minimum density plane with the larger density value extracted so as to set the larger density value to be a local minimum value; a density value conversion control function to convert the local minimum value and local maximum value, generated by replacement with the density value replacing and setting function, of pixels, and the original density value of the input image in the respective pixel at the corresponding positions thereto, into the common minimum value and the common maximum value set previously corresponding to the local minimum value and the local maximum value of the pixels, while maintaining the relative ratio of the densities for the pixels, and linearly convert the original density values of the pixels in the input image simultaneously; and an image density conversion control function to replace the density values of the pixels, which are linearly converted by the density value conversion control function, with the density values of the corresponding pixels of the input image to thereby reconstruct the input image.

With this configuration, a local minimum value and a local maximum value which are optimum for image enhancement processing can be specified from the set pixel area, and the computation thereof can be performed at a higher speed.

Further, an image enhancement processing program according to an exemplary aspect of the present invention is adapted to cause a computer to execute: a maximum/minimum density value specifying function to set, for respective pixels of the input image, pixel areas each having a certain size around the pixels respectively, the pixel areas partially overlapping each other, extract a maximum density value and a minimum density value from a plurality of pixels in one pixel area among the pixel areas set, and specify and store the maximum density value and the minimum density value as a maximum density value and a minimum density value which are common to the pixels in the pixel area; a density value replacing and setting function to, following the extraction of the maximum density value and the minimum density value in the one pixel area, sequentially extract a maximum density value and a minimum density value in another pixel area, and if the maximum density value extracted is smaller than a maximum density value of the same pixel in an overlapping area previously specified, replace the density value of the same pixel with the smaller density value extracted so as to set the smaller density value to be a local maximum value, and at the same time, if the minimum density value extracted is larger than a minimum density value of the same pixel in an overlapping area previously specified, replace the density value of the same pixel with the larger density value extracted so as to set the larger density value to be a local minimum value; a density value conversion control function to convert the local minimum value and the local maximum value, generated by replacement with the density value replacing and setting function, of the pixels and the original density value of the input image in the respective pixel into the common minimum value and the common maximum value set previously corresponding to the local minimum value and the local maximum value of the pixels, while maintaining the relative ratio of the densities for the pixels, and linearly convert the original density values of the pixels in the input image simultaneously; and an image density conversion control function to replace the density values of the pixels, which are linearly converted by the density value conversion control function, with the density values of the corresponding pixels of the input image to thereby reconstruct the input image.

Even with this configuration, a local minimum value and a local maximum value which are optimum for image enhancement processing can be specified from the set pixel area, same as the case described above.

Further, an image enhancement processing program according to an exemplary aspect of the present invention is adapted to cause a computer to execute: a maximum/minimum density value extracting function to set, for respective pixels of the input image, pixel areas each having a certain size, around the pixels respectively, the pixel areas partially overlapping each other, extract a maximum density value and a minimum density value from a plurality of pixels in one pixel area among the pixel areas, and specify and store the maximum density value and the minimum density value as a maximum density value and a minimum density value which are common to the pixels in the pixel area; a local density value specifying function to, if each pixel has a plurality of maximum density values and minimum density values specified corresponding to the respective areas, specify the smallest value among the maximum density values as a local maximum value, and specify the largest value among the minimum density values as a local minimum value; a density value conversion setting function to convert the specified local minimum value and local maximum value of the specified respective pixels and the original density value of the input image in the respective pixel into a common minimum value and a common maximum value, which are set separately and common to the pixels, to thereby make them common values, while maintaining the relative ratio of the densities for the pixels, and linearly convert the original density values of the respective pixels in the input image simultaneously; and an image density conversion control function to replace the density values of the pixels, which are linearly converted by the density value conversion control function, with the density values of the corresponding pixels of the input image to thereby reconstruct the input image.

With this configuration, a local minimum value and a local maximum value which are optimum for image enhancement processing can be specified from the set pixel area, same as the case described above.

EFFECTS OF THE INVENTION

As an exemplary advantage according to the invention, only the target texture can be enhanced even the target texture lies astride the boundary of areas including extremely different background densities, while preventing the noise area boundary from being enhanced and eliminating the background noises. Consequently, detection and extraction of the target texture become easy. In the case of applying the present invention to a latent fingerprint as a texture, a fingerprint ridge which is enhanced properly can be displayed effectively. This makes examination performed by an examiner easier. Further, since features can be extracted by using an image in which background noises are eliminated, the features can be extracted more accurately, which improves the fingerprint matching accuracy.

DESCRIPTION OF EXEMPLARY EMBODIMENTS

First Exemplary Embodiment

Figure 1:
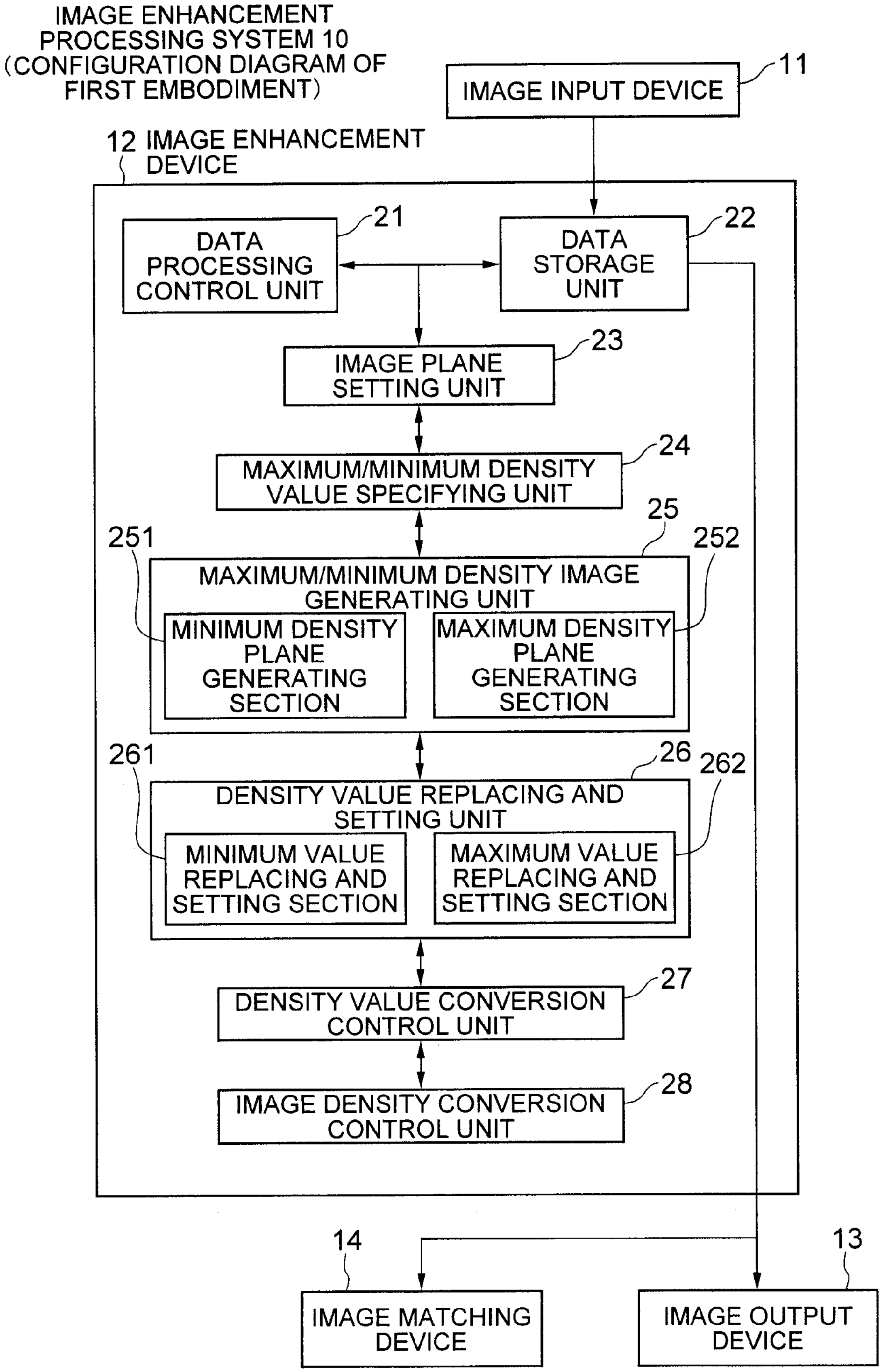
FIG. 1 is a block diagram showing the configuration of an image enhancement processing system according to a first exemplary embodiment.

Hereinafter, the overall configuration of an image enhancement processing system 10 which is an exemplary embodiment (first exemplary embodiment) of the present invention will be described with reference to FIG. 1.

The image enhancement processing system 10 includes an image input device 11 which digitizes and inputs an image read by a sensor or a scanner for example, an image enhancement device 12 including a function of enhancing the image input by the image input device 11, and an image output device 13 which outputs the image enhanced by the image enhancement device 12 to a monitor, a printer, or the like.

Further, the system may be so configured that the image enhanced by the image enhancement device 12 is directly transmitted to an image matching device 14 or the like.

The image enhancement device 12 includes an image plane setting unit 23 and a maximum/minimum density value specifying unit 24. The image plane setting unit 23 sets at least two image planes each of which includes pixels of the number same as that of a plurality of pixels included in an input image. The maximum/minimum density value specifying unit 24 sets a pixel area of a certain size around each pixel of the input image, the pixels partially overlapping each other, and extracts a maximum density value and a minimum density value from a plurality of pixels in one pixel area among the respective areas set, and specifies the values as a maximum density value and a minimum density value which are common to the pixels in the pixel area.

Further, the image enhancement device 12 includes a maximum/minimum density image generation unit 25, and a density value replacing and setting unit 26. The maximum/minimum density image generation unit 25 stores the maximum density value and the minimum density value of the pixels in the specified pixel area into two image planes separately, while correlating the positions of the pixels with each other, to thereby generate a maximum density plane and a minimum density plane. The density value replacing and setting unit 26 sequentially extracts a maximum density value and a minimum density value in another pixel area, following the extraction of the maximum density value and the minimum density value in the one pixel area, and if the extracted maximum density value is smaller than the maximum density value of the same pixel in the overlapping area previously specified, replaces the density value in the same pixel in the maximum density plane with the smaller density value extracted to thereby set the value as a local maximum value. At the same time, if the extracted minimum density value is larger than the minimum density value of the same pixel in the overlapping area previously specified, the unit replaces the density value of the same pixel in the minimum density plane with the larger density value extracted to thereby set the value as a local minimum value.

Further, the image enhancement device 12 includes a density value conversion control unit 27 and an image density conversion control unit 28. The density value conversion control unit 27 uniquely converts the local minimum value and the local maximum value of the corresponding pixels in the maximum density plane and the minimum density plane, generated by replacement by the density value replacing and setting unit 26, and the original density value of the input image in the respective pixel at the corresponding positions thereto, into the common minimum value and the common maximum value which are set in advance corresponding to the local minimum value and the local maximum value of each pixel, while maintaining density relative ratios held by the pixels, and at the same time, linearly converts the original density values of the pixels in the input image. The image density conversion control unit 28 replaces the density values of the pixels which are linearly converted by the density value conversion control unit 27 with the density values of the corresponding pixels of the input image to thereby reconstruct the input image.

Next, the configuration of the image enhancement device 12 will be described.

The image enhancement device 12 includes: a data processing control unit 21 which controls transmission/reception of data and massages performed between respective units, described later, included in the image enhancement device 12; a data storage unit 22 which stores image information and the data input by the image input device 11; an image plane setting unit 23 which sets a minimum density plane and a maximum density plane corresponding to the pixels of the input image; a maximum/minimum density value specifying unit 24 which specifies a minimum density value and a maximum density value based on the density values of the surrounding pixels for each pixel of the input image; a maximum/minimum density image generating unit 25 which sets the density values of the pixels in the minimum density plane and the maximum density plane set; a density value replacing and setting unit 26 which updates the density values of the pixels in the minimum density plane and the maximum density plane; a density value conversion control unit 27 which performs density conversion of the input image based on the density values of the pixels in the minimum density plane and the maximum density plane; and an image density conversion control unit 28 which executes density conversion of the input image and reconstructs the converted image.

Hereinafter, these components will be described in more detail.

The data storage unit 22 includes a RAM (Random Access Memory) for example, which is used as a working area by the respective units and sections described later included in the image enhancement processing unit 12. Further, the data storage unit 22 is also used for temporarily storing information calculated by the respective units.

The image plane setting unit 23 has a plane image setting function to set a minimum density plane and a maximum density plane, which are two different image planes, including pixels corresponding to the respective pixels of the input image, a reference area setting function to set a certain area ("reference area") around each pixel of the input image, and a histogram generating function to generate a density histogram corresponding to each of the reference areas set.

In setting the number of pixels included in the reference area, if each reference area is too large, the performance of eliminating background noises is easily deteriorated in performing image enhancement processing to the input image described below. In contrast, if each reference area is too small, the target texture is easily lost.

Therefore, in the present exemplary embodiment, a circle having a diameter of 20 pixels is set as a reference area since the target texture is fingerprint ridges. This is because, although the average ridge interval between fingerprint ridges is about 10 pixels (actual distance is 0.5 mm), it appears that a circle having a diameter of two times as long as the average ridge interval is suitable as a minimum region which covers variations of the target texture.

Further, in applying the present exemplary embodiment to a palm print having patterns similar to fingerprints, a reference area may set to be a circle having a diameter of about 25 pixels. This is because the average ridge intervals of a palm print is large as much as about 20% to 30% compared with that of a fingerprint.

The maximum/minimum density value specifying unit 24 has a maximum/minimum density value extracting function to extract a minimum density value and a maximum density value of a plurality of pixels included in the reference area, from each density histogram generated by the histogram generating function, and a maximum/minimum density value specifying function to specify the minimum density value and the maximum density value to be common to the pixels in the reference area.

Thereby, the pixels included in the input image have the minimum density value and the maximum density value, besides the original density value in the input image.

Note that the maximum density value and the minimum density value extracted from the density histogram may be the maximum density value and the minimum density value indicated in the histogram, but may be set such that the histogram accumulated value from the maximum value and the minimum value extracts a density value of about 5% in order to eliminate heretical values.

Further, in the first exemplary embodiment, these can be confirmed when the maximum density plane and the minimum density plane are generated, and corresponding thereto, a density value extracted from the density histogram can be set.

The maximum/minimum density image generating unit 25 includes a minimum density plane generating section 251 and a maximum density plane generating section 252.

The minimum density plane generating section 251 has a minimum density setting function to set the specified minimum density value of each pixel in the reference area, as the density value of the corresponding pixel on the minimum density plane.

The maximum density plane generating section 252 has a maximum density setting function to set the specified maximum density value of each pixel in the reference area as the density value of the corresponding pixel on the maximum density plane.

The density value replacing and setting unit 26 includes a minimum value replacing and setting section 261 and a maximum value replacing and setting section 262.

The minimum value replacing and setting section 261 specifies the minimum density value extracted from the reference area newly set by the maximum/minimum density value specifying unit 24 by overlapping it on the pixel previously specified by the minimum density value. At this time, the minimum value replacing and setting section 261 has a local minimum value update function to compare the minimum density value newly extracted with the minimum density value previously specified, and if the newly extracted value is larger than the minimum density value previously specified, to specify the newly extracted minimum density value as the local minimum value of the pixel, and to update the density value set to the pixel corresponding to the minimum density plane to the local minimum value.

Further, the maximum value replacing and setting section 262 has a local maximum value update function to, when specifying the maximum density value extracted from another reference area in the maximum/minimum density value specifying unit 24 by overlapping it, compare the maximum density value newly extracted with the maximum density value previously specified, and if the newly extracted value is smaller than the maximum density value previously specified, replaces and specifies the newly extracted maximum density value to the local maximum value of the pixel, and update the density value set to the corresponding pixel on the maximum density plane to the local maximum value.

Therefore, when the function of updating the local minimum value and the local maximum value is performed to all pixels included in the input image, all of the pixels included in the minimum density plane and the maximum density plane are formed of the local minimum value and the local maximum value.

The density value conversion control unit 27 has a common density value setting function to set a common minimum density value and a common maximum density value which are common to all pixels included in the input image, with respect to the inherent density values included in the image of each pixel of the input image, and a density value converting function to convert the local minimum value set to each corresponding pixel on the minimum density plane into the common minimum density value, and convert the local maximum value set to each corresponding pixel on the maximum density plane into the common maximum density value respectively, to thereby linearly convert the original density value which is unique to each pixel included in the input image, at the same time.

Thereby, the values in the density range from the local minimum value to the local maximum value are linearly converted into the values in the common density range from the common minimum value to the common maximum value.

The conversion formula indicating the linear conversion is established as follows:

$$g'(x,y) = \frac{(g(x,y) - \min P(x,y))(\max T(x,y) - \min T(x,y))}{\max P(x,y) - \min P(x,y)} + \min T(x,y) \quad \text{[Formula 1]}$$

g' (x, y): density value at a coordinate (x, y) of the input image after density-conversion g(x, y): density value at a coordinate (x, y) in the input image minP(x, y): density value at a coordinate (x, y) on the minimum density plane (local minimum value)

maxP(x, y): density value at a coordinate (x, y) on the maximum density plane (local maximum value)

minT(x, y): common minimum density value at a coordinate (x, y) in the input image maxT(x, y): common maximum density value at a coordinate (x, y) in the input image The image density conversion control unit 28 has an image density conversion control function to replace the density value of each pixel which is linearly converted by carrying out the density value converting function with the density value of each corresponding pixel of the input image to thereby reconstruct the input image.

Thereby, the density values converted by the density value converting function are reflected on the density values of the pixels of the input image, so that an image in which image processing to enhance the target texture (e.g., fingerprint in a fingerprint image) is performed can be obtained.

Figure 5:
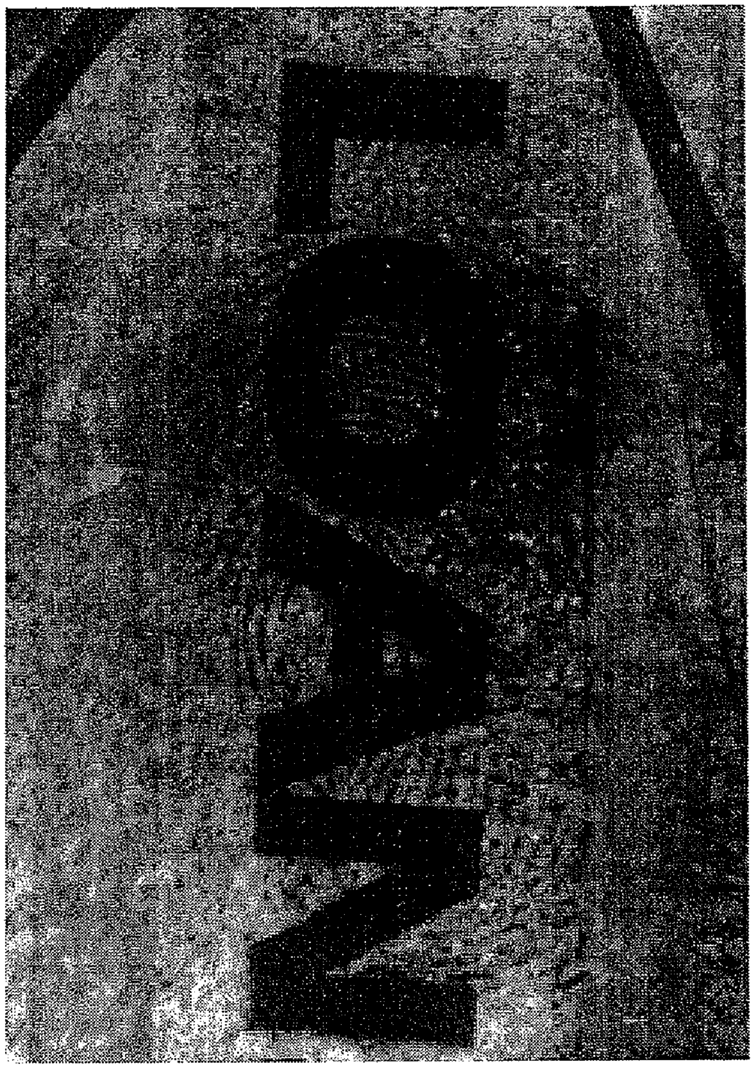
FIG. 5 shows an example of latent fingerprint image.

The exemplary fingerprint image shown in FIG. 5 for example is an image in which the fingerprint image read by a sensor or a scanner is digitized. Such an exemplary fingerprint image is digitized with 500 dpi resolution in accordance with ANSI/NIST-ITL-1-2000 Data Format for the Interchange of Fingerprint, Facial, & Scar Mark & Tattoo (SMT) Information, standardized by the US National Institute of Standards and Technology.

In the standard, an image is digitized so as to have the density value of 256 grayscales from 0 to 255. Further, the density value expression is so defined that the numerical value becomes larger as the brightness increases.

On the other hand, as for the density value expression, the present exemplary embodiment uses such a density standard that the numerical value becomes larger as the density increases. Accordingly, ridge parts with high density show density values close to the maximum value of 255, and valleys and paper surface with low density show density values close to zero.

Operation of First Exemplary Embodiment

Next, overall operation of image density conversion processing in the image enhancement processing system 10 including the above-described configuration will be described.

In the first exemplary embodiment, when image information is input from the image input device 11, at least two image planes each including the same number of pixels as the pixels included in the input image are set by the image plane setting unit 23 (image plane setting step).

Next, among the pixel areas, each having a diameter of 20 pixels, set around the respective pixels of the input image while partially overlapping each other, the maximum/minimum density value specifying unit 24 first extracts a maximum density value and a minimum density value from a plurality of pixels in one pixel area, and specifies them as a common maximum density value and a common minimum density value of the pixels in the area (maximum/minimum density value specifying step).

Then, the maximum density value and the minimum density value of the pixels in the specified pixel area are stored separately in the two image planes, and the positions of the respective pixels are correlated. Thereby, the maximum/minimum density image generating unit 25 generates a maximum density plane and a minimum density plane (maximum/minimum density image generating step).

Following the extraction of the maximum density value and the minimum density value in the pixel area, the density value replacing and setting unit 26 sequentially extracts a maximum density value and a minimum density value in another pixel area. If the extracted maximum density value is smaller than the maximum density value of the same pixel in the overlapping area specified beforehand, the density value replacing and setting unit 26 replaces the density value of the same pixel in the maximum density plane with the smaller density value to thereby set the value as the local maximum value. At the same time, if the extracted minimum density value is larger than the minimum density value of the same pixel in the overlapping area specified beforehand, the density value replacing and setting unit 26 replaces the density value of the same pixel in the minimum density plane with the larger density value to thereby set the value as the local minimum value (density value replacing and setting step).

Then, the density value conversion control unit 27 converts the local minimum value and the local maximum value of the corresponding pixels in the maximum density plane and the minimum density plane which are replaced and set in the density value replacing and setting step and the original density value of the input image in the respective pixel at the corresponding positions thereto, into the common minimum value and the common maximum value which are commonly set in advance corresponding to the local minimum value and the local maximum value of the respective pixels, while maintaining the relative ratio of the densities for the pixels. At the same time, the density value conversion control unit 27 linearly converts the original density values of the pixels in the input image (density value converting step).

Finally, the image density conversion control unit 28 reconstructs the input image based on the density values of the pixels which are linearly converted in the density value converting step (image density converting step).

Note that the image plane setting step, the maximum/minimum density value specifying step, the maximum/minimum density image generating step, the density value replacing and setting step, the density value converting step and the image density converting step may be so configured that the executing contents are programmed to be executed by a computer.

Figure 2:
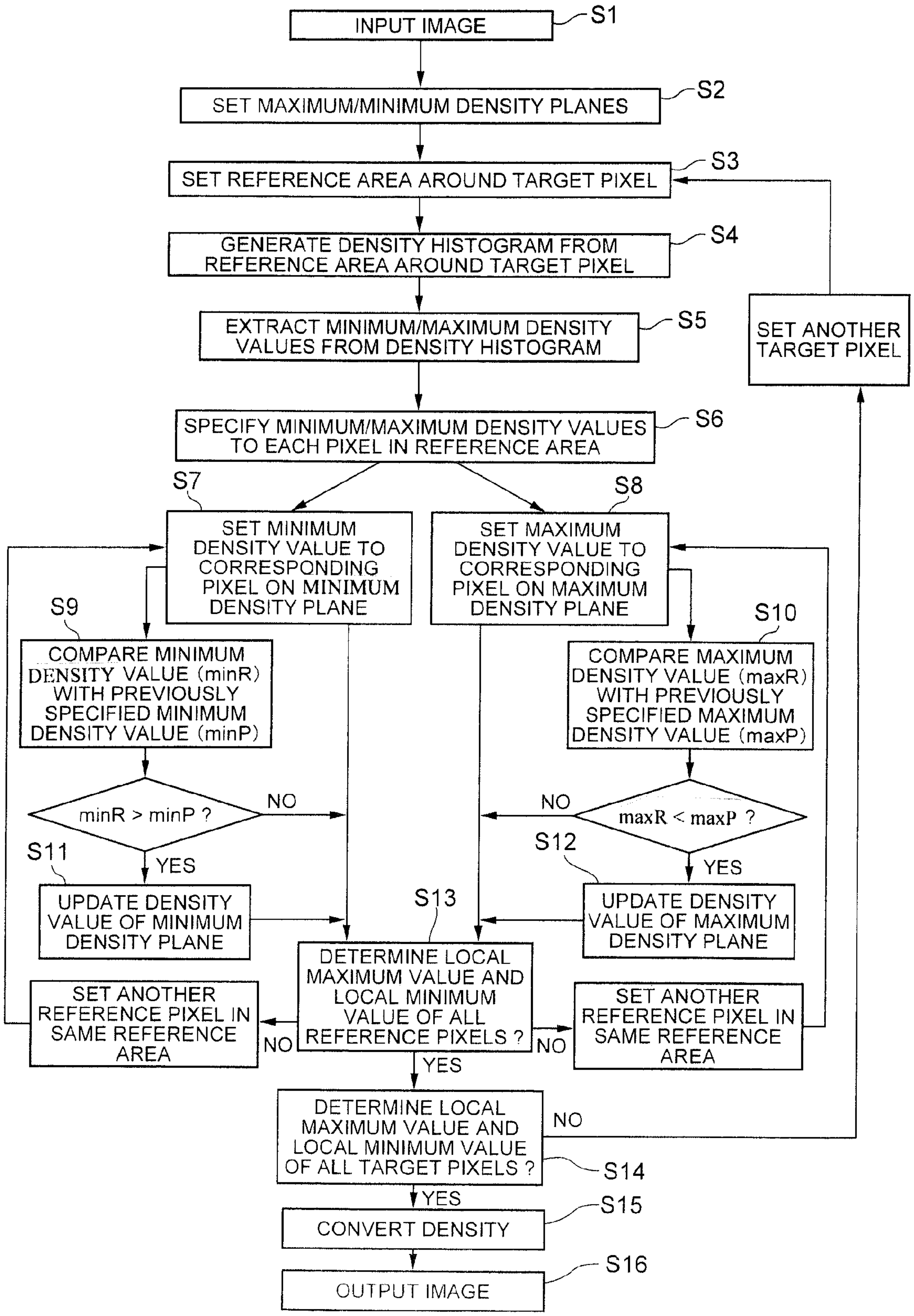
FIG. 2 is a flowchart showing the flow of image density conversion processing according to the first exemplary embodiment.
Figure 3:
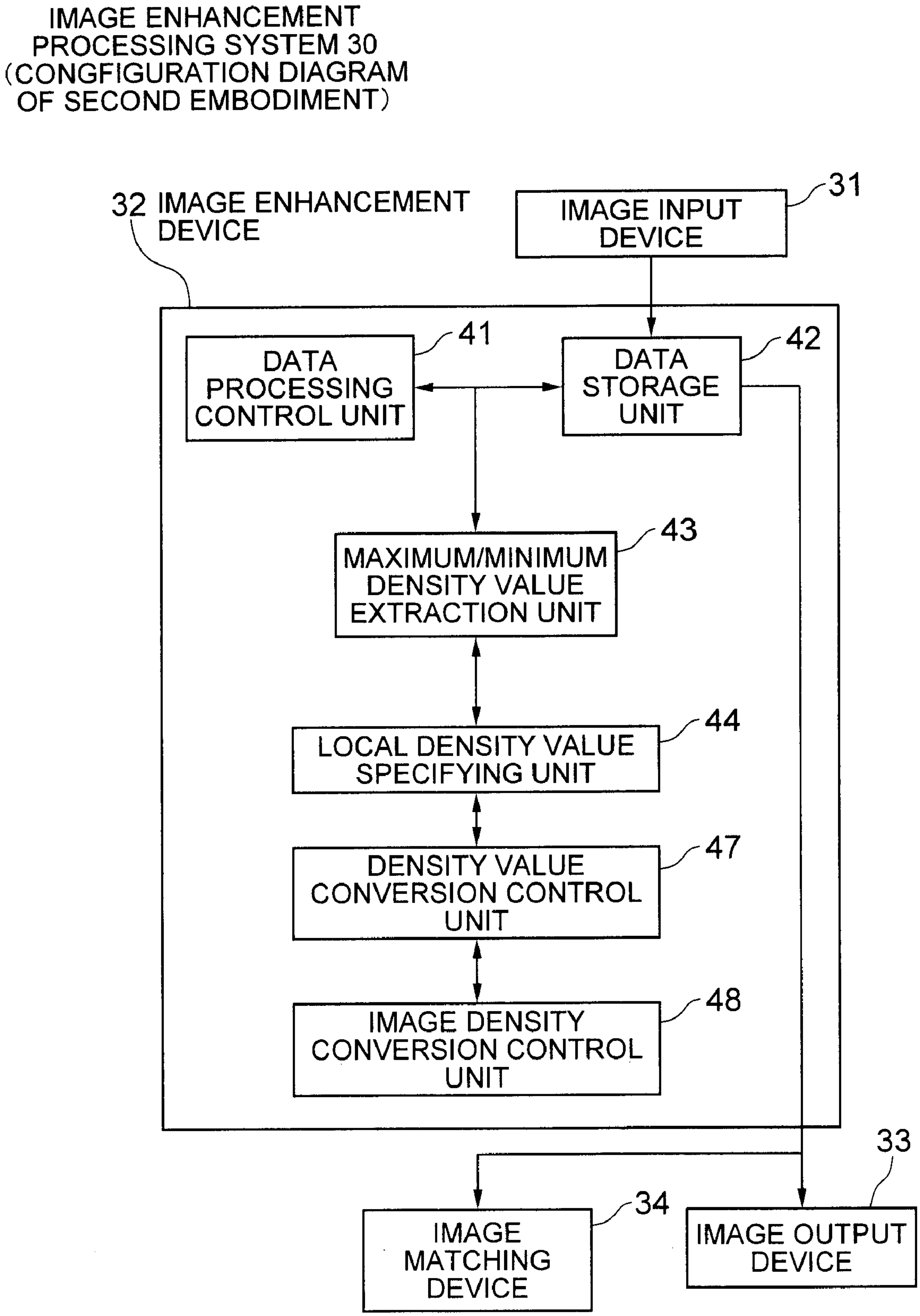
FIG. 3 is a block diagram showing the configuration of an image enhancement processing system according to a second exemplary embodiment.

Hereinafter, more detailed explanation will be given based on the flowchart of FIG. 2.

First, the image input device 11 shown in FIG. 1 stores an input image in the data storage unit 22 provided to the image enhancement device 12 (step S1).

This is performed by digitizing and inputting a scanned image for example. Further, an image file which has been digitalized may be used as the input object.

Next, the image plane setting unit 23 shown in FIG. 1 sets the maximum density plane and the minimum density plane having the same number of pixels as the number of pixels of the input image (step 2: image plane setting step).

Note that the density values of all pixels included in the maximum density plane may initially be set to the same value (e.g., 255). Similarly, the density values of all pixels included in the minimum density plane may initially be set to the same value (e.g., 0).

An area (reference area) having a diameter of 20 pixels is set around one pixel among the respective pixels (target pixels) included in the input image, and a density histogram corresponding to the set reference area is generated (steps S3, S4).

Then, the maximum/minimum density value specifying unit 24 extracts the minimum density value and the maximum density value from the density histogram generated from the reference area, and also specifies the minimum density value and the maximum density value which are common to the pixels in the reference area (steps S5, S6: maximum/minimum density value specifying step).

Thereby, the pixels in the reference area of the input image have the minimum density value and the maximum density value specified besides the inherent density value.

Next, the minimum density plane generating section 251 in the maximum/minimum density image generating unit 25 sets the minimum density value to be the density value of the pixel on the minimum density plane corresponding to the pixel in which the minimum density value is specified, and the maximum density plane generating section 252 in the maximum/minimum density image generating unit 25 sets the maximum density value to be the density value of the pixel on the maximum density plane corresponding to the pixel in which the maximum density value is specified (steps S7, S8: maximum/minimum density value setting step).

If the minimum density value and the maximum density value have been set in the corresponding pixels in the minimum density plane and the maximum density plane, the minimum value replacing and setting section 261 in the density value replacing and setting unit 26 compares the sequentially extracted minimum density value (minR) with the previously specified minimum density value (minP) for each reference area (step S9), and if the later extracted value (minR) is larger than the previously specified minimum density value (minP), the minimum value replacing and setting section 261 specifies the later extracted minimum density value (minR) as the local minimum value of the pixel, and updates the density value set to the pixel on the minimum density plane corresponding to the pixel in the common area to the local minimum value (step S11). At the same time, the maximum value replacing and setting section 262 in the density value replacing and setting unit 26 compares the later extracted maximum density value (maxR) with the previously specified maximum density value (maxP) (step S10), and if the later extracted value (maxR) is smaller than the previously specified maximum density value (maxP), the maximum value replacing and setting section 262 updates such that the later extracted maximum density value (maxR) to be the local maximum value of the pixel, and updates the density value set to the pixel on the maximum density plane corresponding to the pixel in the common area as the local maximum value (step S12).

Next, for all pixels in the reference area, it is determined whether updating of the local minimum value and the local maximum value are carried out for the density values of the pixels in the corresponding pixel areas on the minimum density plane and the maximum density plane (step S13).

If update has not been completed for all reference pixels, another reference pixel in the same reference area is set, and minP and minR of the corresponding pixel on the minimum density plane are compared, and maxP and maxR of the corresponding pixel on the maximum density plane are compared (step S9, S10).

If update of the local minimum values and the local maximum values for all reference pixels have been carried out, it is then determined whether the local minimum values and the local maximum values for all target pixels of the input image are updated (step S14).

If update has not been carried out for all pixels, another target pixel is set and an area corresponding to the target pixel is also set, and the processing is continued from the step S3.

Thereby, the density value of each pixel on the minimum density plane determined finally is set to be the local minimum value which is the largest value among the minimum density values extracted from the respective reference areas which are set including the pixel. Similarly, the density value of each pixel on the maximum density plane is set to be the local maximum value which is the smallest value among the maximum density values extracted from the respective reference areas which are set including the pixel.

Figure 7A:
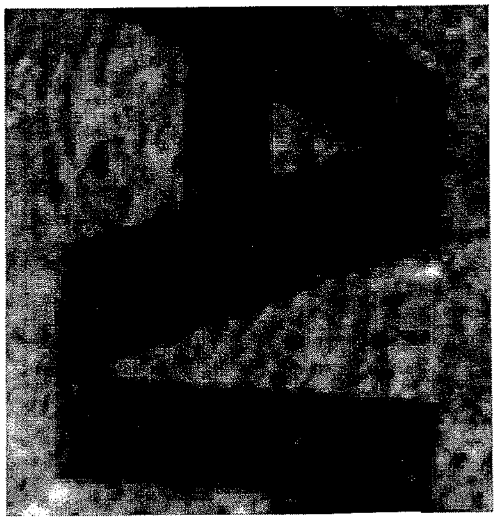
FIG. 7A shows an exemplary input image.
Figure 7B:
FIGS. 7B and 7C illustrate conventional shortcomings.
Figure 7C:
Figure 8A:
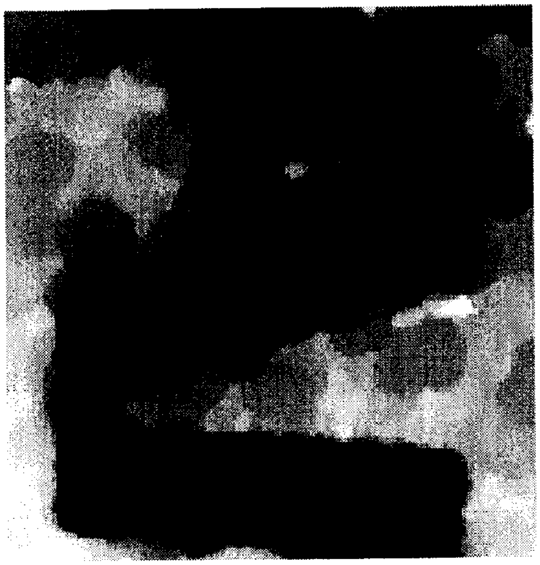
FIG. 8A shows an example of a minimum density plane according to the present invention.

FIG. 8A shows a minimum density plane generated through the above-described process performed to FIG. 7A showing an input image. In FIG. 8A, the local minimum values are different significantly along the background noise area boundary, and the local minimum values near the background noise boundary are expressed properly.

Figure 8B:
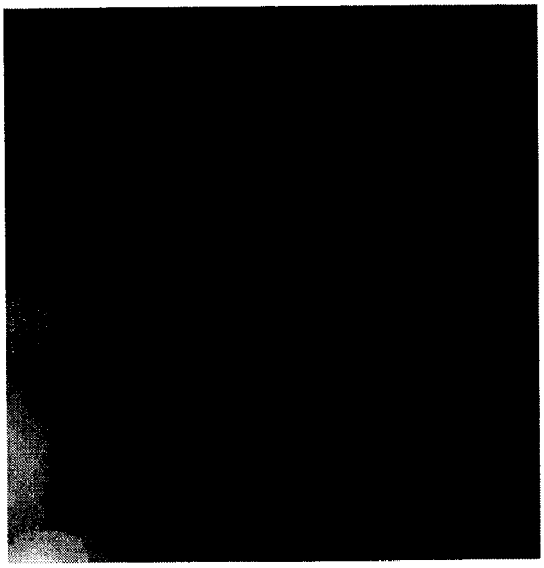
FIG. 8B shows an example of the maximum density plane according to the present invention.

Similarly, FIG. 8B shows a maximum density plane generated through the above-described process performed to FIG. 7A. In FIG. 8B, the local maximum values are different significantly along the background noise area boundary, and the local maximum values near the background noise boundary are expressed properly as well.

Next, with respect to the inherent density values of the pixels included in the input image, the density value conversion control unit 27 sets a common minimum density value and a common maximum density value which are common to all pixels included in the input image. In this example, zero is set as the common minimum value and 255 is set as the common maximum value to all pixels of the input image.

If the dynamic range of the input image is extremely narrow or all density values in the reference area are same, the predetermined special value may be set as the common minimum value for each target pixel.

For example, if all pixels in the reference area have the same density value so that the difference between maxP and minP finally becomes zero, the area is determined that there is no target texture. Therefore, as a representative value of the background density, an intermediate value such as 32 may be set as a conversion density value.

Note that the density value conversion control unit 27 converts the local minimum value set to each corresponding pixel on the minimum density plane to be the common minimum density value (0), and converts the local maximum value set to each corresponding pixel on the maximum density plane to be the common maximum density value (255), respectively, to thereby linearly convert the inherent original density values of the respective pixels included in the input image at the same time (step S15).

In other words, by converting the local minimum value into the common minimum density value (0) and converting the local maximum value into the common maximum density value (255) without changing the relative ratio of the density values (original density values) of the target pixels, the density value of the pixel corresponding thereto on the minimum density plane (local minimum value), and the density value of the pixel corresponding thereto on the maximum density plane (local maximum value), the density values of the pixels of the whole image are converted to have the equivalent dynamic range.

Thereby, the density range from the local minimum value to the local maximum value of each pixel is proportionally converted into the common density value range from the common minimum density value to the common maximum density value and is expanded, so that the density value of each target pixel is converted to a density value determined by the relative ratio to the common minimum density value and the common maximum density value. Thereby, the input image is converted into an image having a wide density range and enhanced contrast.

In order to perform the conversion described above, the following formula 2 is used to obtain the density value after conversion, with the density value of the corresponding pixel address being the variable.

$$g'(x, y) = \frac{(g(x, y) - \min P(x, y))(\max T(x, y) - \min T(x, y))}{\max P(x, y) - \min P(x, y)} + \min T(x, y) \quad \text{[Formula 2]}$$

g'(x, y): density value at a coordinate (x, y) in the input image after density-conversion g(x, y): density value at a coordinate (x, y) of the input image minP(x, y): density value at a coordinate (x, y) on the minimum density plane (local minimum value)

maxP(x, y): density value at a coordinate (x, y) on the maximum density plane (local maximum value)

minT(x, y): common minimum density value at a coordinate (x, y) in the input image (0 is set in this example)

maxT(x, y): common maximum density value at a coordinate (x, y) in the input image (255 is set in this example)

However, if the density value g' (x,y) after conversion becomes lower than 0, it is converted to 0, and if the density value becomes higher than 255, it is converted to 255.

Further, for the common minimum density value and the common maximum density value, if the dynamic range is extremely narrow so that the difference between maxP and minP becomes small, appropriate intermediate values (e.g., 64 and 192) may be set so as to prevent the image from being enhanced too much after conversion.

Next, the image density conversion control unit 28 replaces the density values of the pixels which have been linearly converted through the density value conversion, with the density values of the pixels in the input image, to thereby perform density conversion.

The image which is density-converted and reconstructed as described above is input into the image output device 13, and is displayed on a monitor or is output by a printer (step S16).

Although a density histogram is used for extracting the maximum density value and the minimum density value in the present exemplary embodiment, it is also acceptable that the maximum and minimum density values are extracted by storing the density values of the pixels in the reference area set in the data storage unit.

Figure 9:
FIG. 9 shows an example of image enhancement according to the present invention.

FIG. 9 shows an example of image enhancement in the case where density conversion according to the above-described exemplary embodiment is performed to the input image shown in FIG. 7A. In the image, the fingerprint ridge which is the target texture is enhanced, and the background noise is suppressed.

As described above, in the first exemplary embodiment of the present invention, the local minimum value and the local maximum value specified for each pixel of an input image are determined from the values extracted not only from one reference area but also from all reference areas set including each pixel. Therefore, even in the case where each pixel is placed near or adjacent to the background noise area boundary, appropriate local minimum value and local maximum value can be extracted from the surrounding pixels of each pixel.

Second Exemplary Embodiment

Hereinafter, another exemplary embodiment according to the present invention will be described.

The second exemplary embodiment is different from the first exemplary embodiment in the following aspects. That is, in the first exemplary embodiment, two planes corresponding to the input image are set, and a local minimum value and a local maximum value specified for each pixel included in the input image are set as the density values of each pixel in each plane to thereby generate a maximum density plane and a minimum density plane. On the other hand, in the second exemplary embodiment, an area for storing a local minimum value and a local maximum value for each pixel of an input image is secured on a data storage unit 42, thereby the final local minimum value and local maximum value held by each pixel are calculated using a plurality of maximum density values and minimum density values for each pixel stored in the data storage unit 42.

Further, although the first exemplary embodiment uses a method in which a minimum density value and a maximum density value extracted from each pixel area are sequentially compared with a local minimum value and a local maximum value, and are updated and calculated step by step, the second exemplary embodiment uses a method in which a local minimum value and a local maximum value are calculated from a plurality of extracted minimum density values and maximum density values for the respective pixels stored in the data storage unit 42.

In other words, each pixel of an input image belongs to a plurality of reference areas, and has a plurality of minimum density values and maximum density values extracted from the respective reference areas, so the largest value among the minimum density values is specified as a local minimum value, and the smallest value among the maximum density values is specified as a local maximum value.

This aspect will be described below.

The second exemplary embodiment is so configured as to include an image input device 31, an image enhancement device 32, and an image output device 33, same as the first exemplary embodiment. The second exemplary embodiment may be so configured that an image enhanced by the image enhancement device 32 is directly transmitted to an image matching device 34.

The image enhancement device 32 includes: a data processing control unit 41; a data storage unit 42; a maximum/minimum density value extracting unit 43 including an area setting function to set, with respect to a plurality of pixels included in an input image input to the data storage unit 42, pixel areas (referred to as "reference areas") each having a diameter of 20 pixels around the respective pixel and partially overlapping each other; a local density value specifying unit 44 which specifies a local minimum value and a local maximum value with respect to each pixel of the input image; and a density value conversion control unit 47 and an image density conversion control unit 48 which includes the same functions as those of the first exemplary embodiment.

The maximum/minimum density value extraction unit 43 has a maximum/minimum density value storing function to extract a maximum density value and a minimum density value of the pixels in each pixel area set by the area setting function for each pixel area, specify them as the maximum density value and the minimum density value common to the pixels in the area, and store them in the data storage unit 42.

The local density value specifying unit 44 has a local maximum/minimum value specifying function to, if each pixel includes a plurality of maximum density values and minimum density values specified by the maximum/minimum density value extracting unit 43, specify the smallest value among the maximum density values as a local maximum value, and specify the largest value among the minimum density values as a local minimum value.

Thereby, reference areas are set for all pixels included in the input image, and the minimum density values and the maximum density values are extracted from all references areas and stored, so that the efficiency for calculating the local maximum value and the local minimum value can be improved.

Operation of Second Exemplary Embodiment

In the second exemplary embodiment, when image is input by the image input device 31, the maximum/minimum density value extraction unit 43 sets, with respect to the pixels included in the input image, pixel areas partially overlapping each other, each of which has a diameter of 20 pixels and is set around each pixel. The maximum/minimum density value extraction unit 43 extracts, for each pixel area, the maximum density value and the minimum density value of the pixels in each pixel area, stores them in the data storage unit 42, and specifies them as the maximum density value and the minimum density value which are common to the respective pixels in each area (first step).

Then, if a plurality of maximum density values and minimum density values for the respective areas, specified in the first step, are stored in the data storage unit 42, the local density value specifying unit 44 specifies the smallest value among the stored maximum density values as the local maximum value, and the largest value among the stored minimum density values as the local minimum value (second step).

Then, the density value conversion control unit 47 converts the specified local minimum value and local maximum value for each of the pixels and the original density value in the input image of each pixel into the common minimum value and the common maximum value of each pixel which is set differently, while maintaining the relative ratio of each density of the pixel, to thereby linearly convert the original density values of the pixels in the input image simultaneously (third step).

Finally, the image density conversion control unit 48 reconstructs the input image based on the density values of the pixels which are linearly converted in the third step (fourth step).

Note that the first step, the second step, the third step and the fourth step described above may be programmed and executed by a computer.

Further, the third step and the fourth step correspond to the density value converting step and the image density converting step of the first exemplary embodiment, so the density values are linearly converted in the similar manner based on the specified local minimum value and local maximum value of the pixels and the original density values of the pixels in the input image (first exemplary embodiment, steps S15 to S16).

Note that it is acceptable to generate a minimum density plane and a maximum density plane corresponding to the input image based on the local maximum value and the local minimum value of each pixel specified in the second step.

Thereby, the density values extracted from the respective reference areas can be set to values adapted to the input image by confirming the maximum density plane and the minimum density plane.

Similar to the first exemplary embodiment, the maximum density value and the minimum density value extracted from the reference area may be the maximum value and the minimum value among the density values, in the second exemplary embodiment. However, in order to eliminate heretical values, it is acceptable to extract density values in which the histogram accumulation value from the maximum value and the minimum value is about 5%.

Figure 4:
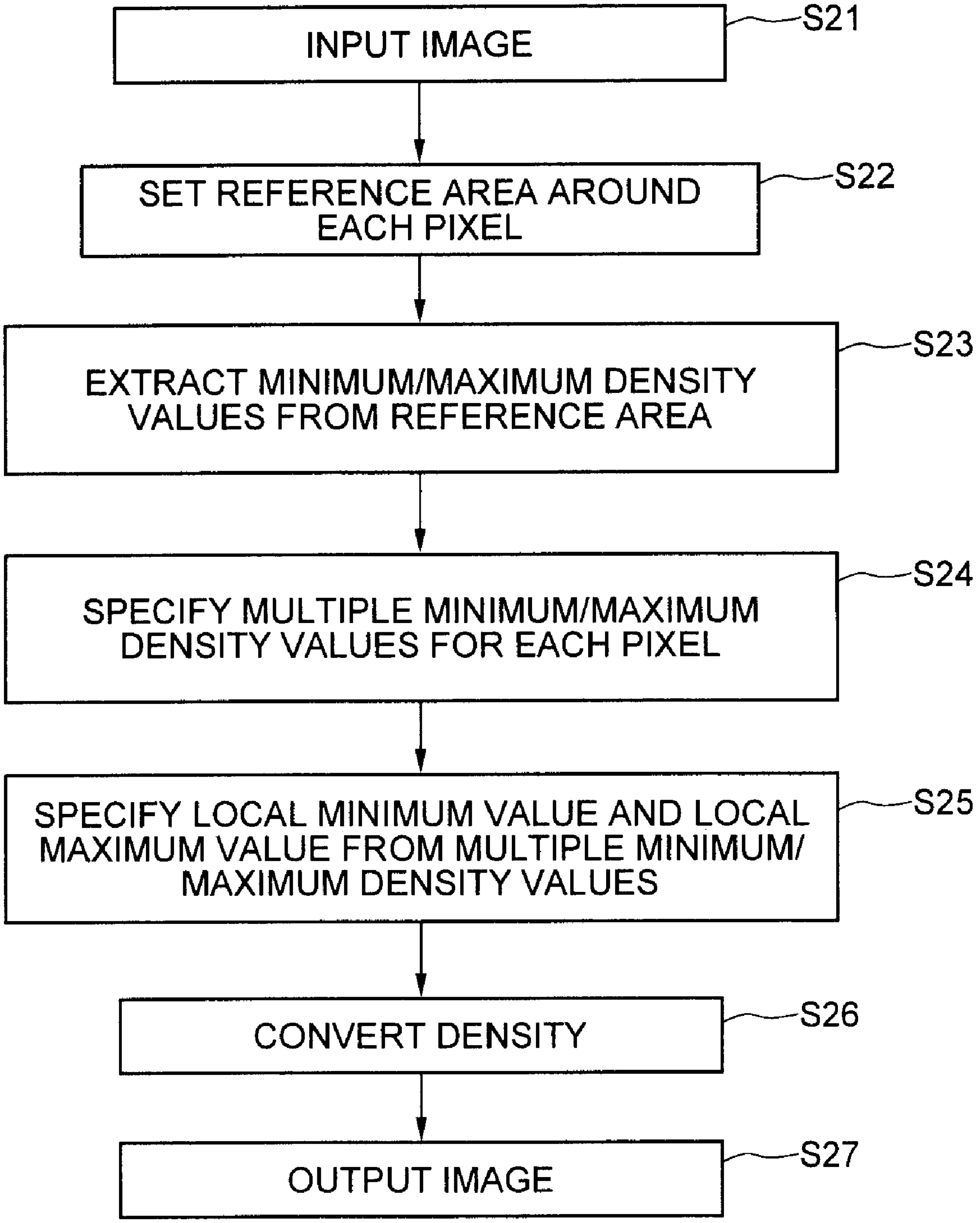
FIG. 4 is a flowchart showing the flow of image density conversion processing according to the second exemplary embodiment.

Next, overall operation of the image density conversion processing in the image enhancement processing system 30 of the above-described configuration will be described based on the flowchart shown in FIG. 4.

First, the image input device 31 stores the input image in the data storage unit 42 in the image enhancement device 32 (step S21).

This is performed by digitizing and inputting the image read by a scanner for example. Further, an image file which has been digitized may be used as the input object.

Next, the maximum/minimum density value extraction unit 43 sets, for all of the pixels (referred to as "target pixels") included in the input image, areas (reference areas) around the pixels respectively, each having a diameter of 20 pixels (step S22). The maximum density values and the minimum density values of the pixels in each set area (reference area) are extracted for each pixel area and are stored in the data storage unit 42 (step S23).

Note that in extracting the maximum density values and the minimum density values from each reference area, a density histogram may be set for each reference area to thereby extract the values.

Further, although the maximum density value and the minimum density value to be extracted may be the maximum and minimum density values of each reference area, density values in which the histogram accumulation value from the maximum value and the minimum value is about 5% may be set to be extracted in order to eliminate heretical values.

Next, these values are specified as the maximum density value and the minimum density value, which are common to the respective pixels in the reference area (step S24).

Thereby, since the pixels included in common areas in which a plurality of reference areas overlap are included in (belonging to) a plurality of reference areas simultaneously, each of the pixels has minimum density values and maximum density value of the same number as the number of reference areas where it belongs to (steps S22 to S24: first step).

Next, among the maximum density values and the minimum density values held by the respective pixels and stored in the data storage unit 42, the smallest value of the stored maximum density values is specified as a local maximum value, and the largest value among the stored minimum density values is specified as a local minimum value (step S25: second step).

Thereby, the local minimum value and the local maximum value are specified for each of the pixels included in the input image, so each of the pixels holds three values together with the inherent density value.

Then, the density conversion processing is performed in the same manner as that of the first exemplary embodiment.

The density value conversion control unit 47 sets, with respect to the inherent density values forming the image of the respective pixels of the input image, a common minimum density value and a common maximum density value which are common to all pixels included in the input image (step S26). In this case, zero is set as the common minimum value and 255 is set as the common maximum value to all of the pixels of the input image.

If the dynamic range of an input image is extremely narrow or all density values in a reference area are same, the predetermined special value may be set as the common minimum value for each target pixel.

For example, if all of the pixels in a reference area have the same distance value so that the difference between maxP and minP becomes zero, it is determined that there is no target texture, so an intermediate value such as 32 may be set as a conversion density value as the representative value of the background density.

By converting the local minimum value set to each corresponding pixel on the minimum density plane to the common minimum value (0) and converting the local maximum value set to each corresponding pixel on the maximum density plane to the common maximum density value (255), the original density value which is inherent to each pixel included in the input image is linearly converted simultaneously.

In other words, the local minimum value is converted to the common minimum density value (0) and the local maximum value to the common maximum density value (255) without changing the relative ratio among the density value (original density value) of each target pixel, and the density value of a pixel, corresponding to the target pixel, on the minimum density plane (local minimum value), and the density value of a pixel on the maximum density plane (local maximum value).

Thereby, the density range from the local minimum value to the local maximum value of each pixel is converted and expanded to the common density value range from the common minimum density value to the common maximum density value, so the density value of each target pixel is converted to a density value which is determined by the relative ratio of the common minimum density value and the common maximum density value, so the input image is converted to an image having larger density range and enhanced contrast.

For the conversion described above, the density value after conversion is obtained from the following Formula 3 by using the density value held by the corresponding pixel as a variable.

$$g'(x,y) = \frac{(g(x,y) - \min P(x,y))(\max T(x,y) - \min T(x,y))}{\max P(x,y) - \min P(x,y)} + \min T(x,y) \quad \text{[Formula 3]}$$

g'(x, y): density value at a coordinate (x, y) in the input image after density-conversion g(x, y): density value at a coordinate (x, y) of the input image minP(x, y): local minimum value at a coordinate (x, y)

maxP(x, y): local maximum value at a coordinate (x, y)

minT(x, y): common minimum density value at a coordinate (x, y) in the input image (0 is set in this example)

maxT(x, y): common maximum density value at a coordinate (x, y) in the input image (255 is set in this example)

However, if the density value g' (x,y) after conversion becomes lower than 0, the value is replaced with 0, and if the value becomes higher than 255, it is replaced with 255.

Next, the image density conversion control unit 48 replaces the density value of each pixel, which is linearly converted, with the density value of each pixel of the input image, to thereby perform density conversion.

As described above, the image, which is density-converted and reconstructed, is input to the image output device 33 and is displayed on a monitor or output to a printer (step S27).

Note the that image enhancement processing may be performed by generating the maximum density plane and the minimum density plane in the similar manner as the first exemplary embodiment, based on the local maximum value and the local minimum value specified in the step S25 of the second exemplary embodiment.

Further, although, in the second exemplary embodiment, the local maximum value and the local minimum value of each pixel are specified from a plurality of maximum density values and minimum density values extracted from the input image and stored in the data storage unit 42, the final local maximum value and local minimum value of each pixel may be specified by a method of comparing the values extracted for each reference area and updating sequentially, in the same manner as the first exemplary embodiment.

As described above, in the first exemplary embodiment and the second exemplary embodiment, the local minimum value and the local maximum value specified for each pixel of the input image includes the pixels having averaged density values excluding extremely low density values and extremely high density values, among the density values which are relatively specified from the density values of an area surrounding each pixel. By converting densities by using the local minimum value and the local maximum value determined in this manner, it is possible to obtain an image in which the background noise area boundary is not enhanced but is suppressed, and only the texture is enhanced, even near the background noise area boundary.

Figure 10:
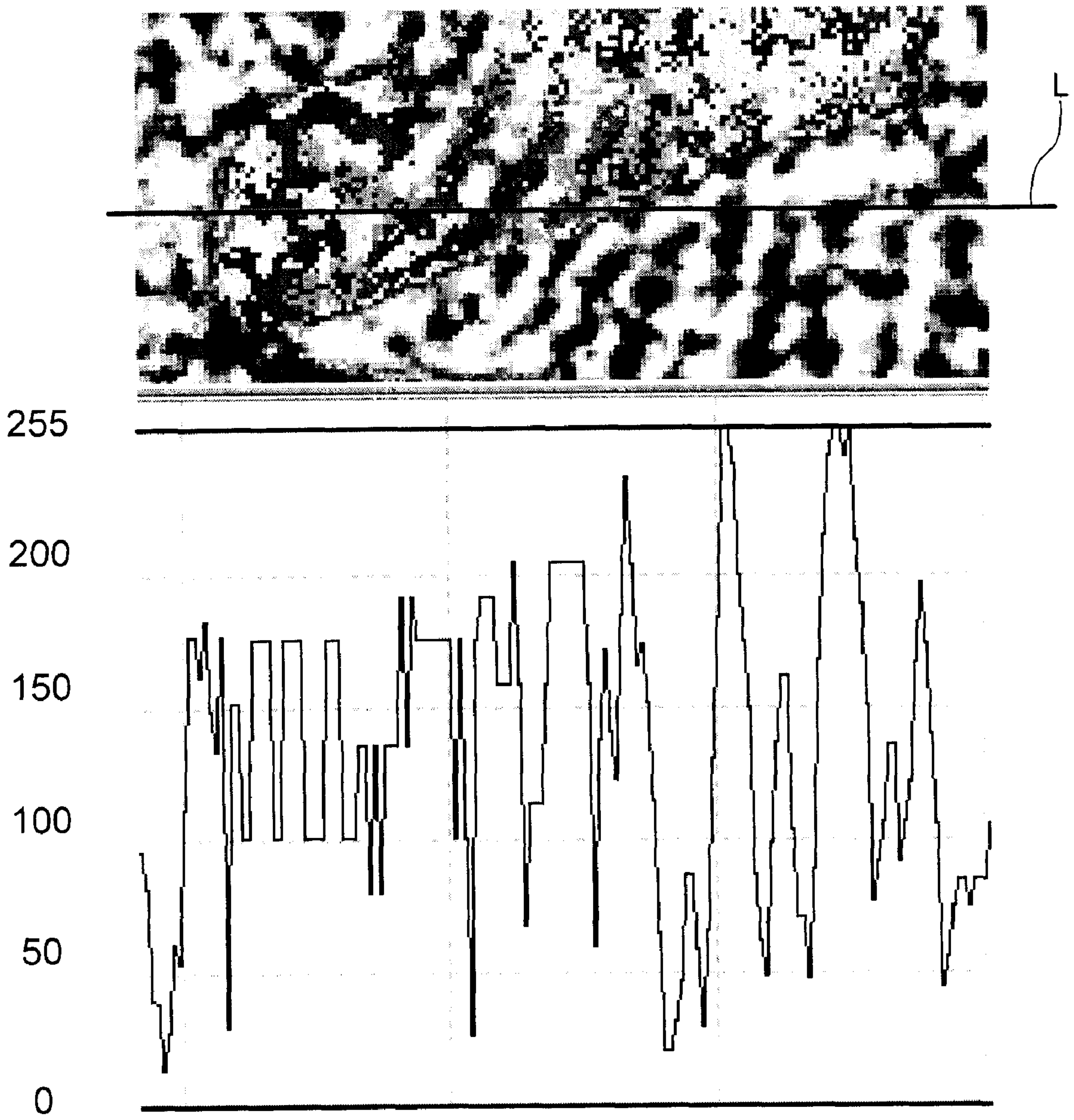
FIG. 10 shows a profile near the boundary of a background noise area in FIG. 9.

For the exemplary enhanced image according to the present exemplary embodiments (first and second exemplary embodiments) shown in FIG. 9, one in which only the part near the background noise area boundary is enlarged and an image profile on the line L is shown, is illustrated in FIG. 10. The position of the line L in FIG. 10 is same as the position of the line L in the input image shown in FIG. 6.

Figure 6:
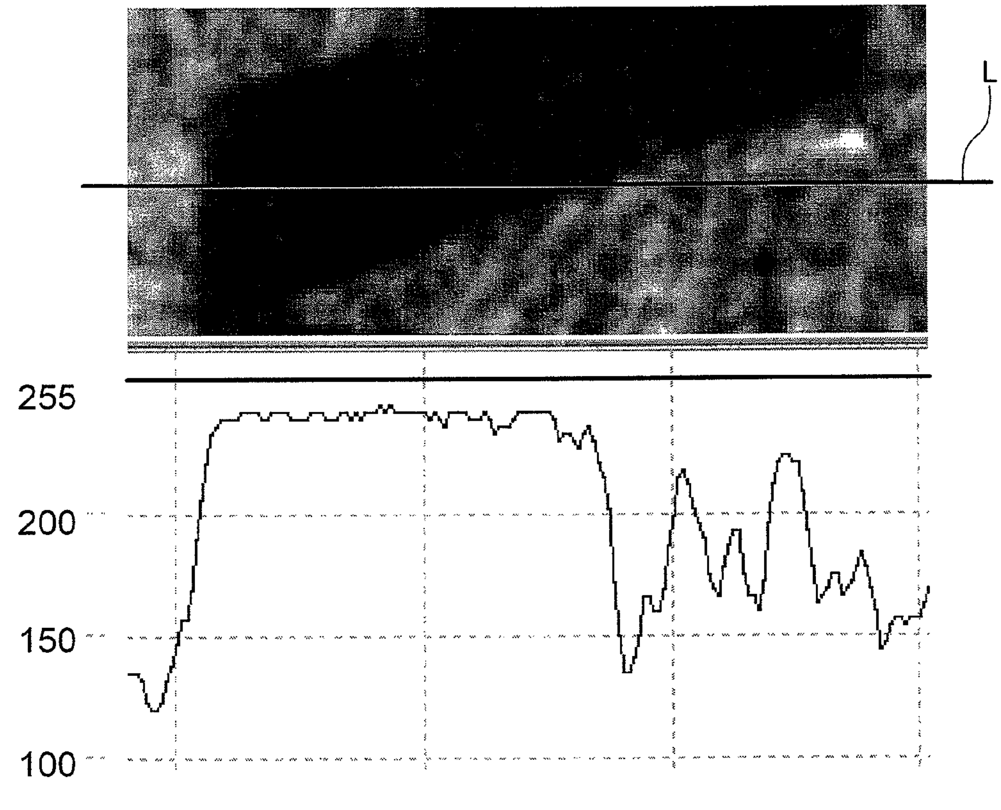
FIG. 6 shows a profile near the boundary of a background noise area in FIG. 5.

As shown in FIG. 10, even an area including background noises, the dynamic range of the fingerprint ridge is enlarged significantly, compared with FIG. 6. On the other hand, the background noise area boundary is not enhanced, so the background noise is reduced and eliminated effectively.

Thereby, values which appropriately represent the minimum density value and the maximum density value of an area to which each pixel belongs in the input image can be extracted.

Note that in the first and second exemplary embodiments, image enhancement processing is performed by using fingerprints as the target texture, so an example in which a reference area with respect to an input image is set as a circle having a diameter of about 20 pixels. However, in the case where a palm print is used as a target texture, a reference area will be set as a circle having a diameter of about 25 pixels.

Further, although the shape of a reference area is set as a circle in the first and second exemplary embodiments, if the background noise is rectangle, it is desirable to use a rectangle (e.g., square) reference area in order to density-convert the part near the peak of the rectangle background noise accurately. Alternatively, a reference area in a shape of a square rotated at an appropriate rotating angle may be set.

By using a plurality of reference areas of different shapes while combining them, background noises in any shape can be eliminated and suppressed more effectively.

Further, the image density conversion step may be an image density conversion step in which the density value of each pixel which is linearly converted in the density value conversion step is replaced with the original density value of each corresponding pixel of the input image to thereby reconstruct the input image.

Further, a density plane generating step may be included for separating the local maximum value and the local minimum value of each pixel specified in the second step to thereby generate a minimum density plane and a maximum density plane corresponding to the input image and corresponding to a plurality of pixels included in the input image.

Further, the fourth step may be a step in which the density value of each pixel linearly converted with the density value of each pixel linearly converted in the third step is replaced with the density value of each corresponding pixel of the input image to thereby reconstruct the input image.

INDUSTRIAL APPLICABILITY

The present invention is available to applications such as security improvement using fingerprints and palm prints.

It should be apparent to those skilled in the art that the present invention may be embodied in many other specific forms without departing from the spirit or scope of the invention. Therefore, the present invention is not to be limited to the details given herein, but may be modified within the scope and equivalence of the appended claims.

What is claimed is:

1. An image density conversion method, comprising of:

setting at least two image planes each of which includes a plurality of pixels of a number same as that of pixels included in an input image;

setting, for respective pixels of the input image, pixel areas each having a certain size, around the pixels respectively, the pixel areas partially overlapping each other, extracting a maximum density value and a minimum density value from a plurality of pixels in one pixel area among the pixel area, and specifying the maximum density value and the minimum density value as a maximum density value and a minimum density value which are common to the pixels in the pixel area;

storing the specified maximum density value and the specified minimum density value of the pixels of the pixel area in the two pixel planes separately, while corresponding positions of the pixels in the two pixel planes with each other, to thereby generate a maximum density plane and a minimum density plane;

following extraction of the maximum density value and the minimum density value in the one pixel area, sequentially extracting a maximum density value and a minimum density value in another pixel area, and if the maximum density value extracted is smaller than a maximum density value of the same pixel in an overlapping area previously set, replacing the density value of the same pixel in the maximum density plane with the smaller density value so as to set the smaller density value to be a local maximum value, and if the minimum density value extracted is larger than a minimum density value of the same pixel in an overlapping area previously set, replacing the density value of the same pixel in the minimum density plane with the larger density value so as to set the larger density value to be a local minimum value;

converting the generated local minimum value and local maximum value of corresponding pixels in the maximum density plane and in the minimum density plane and the original density value of the input image in the respective pixel at the corresponding positions thereto, into the common minimum value and the common maximum value previously set corresponding to the local minimum value and the local maximum value of the pixels, while maintaining a relative ratio of densities for the pixels, and linearly converting original density values in the input image simultaneously; and reconstructing the input image based on the linearly converted density values of the pixels.

2. An image density conversion method, comprising of:

setting, for respective pixels of an input image, pixel areas each having a certain size, around the pixels respectively, the pixel areas partially overlapping each other, extracting a maximum density value and a minimum density value from a plurality of pixels in one pixel area among the pixel areas set, and specifying the maximum density value and the minimum density value as a maximum density value and a minimum density value which are common to the pixels in the pixel area;

following extraction of the maximum density value and the minimum density value in the one pixel area, sequentially extracting a maximum density value and a minimum density value in another pixel area, and if the maximum density value extracted is smaller than a maximum density value of the same pixel in an overlapping area previously specified, replacing the density value of the same pixel with the smaller density value extracted so as to set the smaller density value to be a local maximum value, and at the same time, if the minimum density value extracted is larger than a minimum density value of the same pixel in an overlapping area previously specified, replacing the density value of the same pixel with the larger density value extracted so as to set the larger density value to be a local minimum value;

converting the local minimum value and the local maximum value, generated by replacement, of the pixels and the original density value of the input image in the respective pixel into a common minimum value and a common maximum value previously set corresponding to the local minimum value and the local maximum value of the pixels, while maintaining a relative ratio of densities for the pixels, and linearly converting original density values of the pixels in the input image simultaneously; and reconstructing the input image based on the linearly converted density values of the pixels.

3. The image density conversion method, according to claim 1, comprising of, replacing the density values of the pixels which are linearly converted with original density values of corresponding pixels in the input image, to thereby reconstruct the input image.

4. An image density conversion method, comprising of:

setting, for respective pixels of an input image, pixel areas each having a certain size, around the pixels respectively, the pixel areas partially overlapping each other, extracting a maximum density value and a minimum density value of pixels for each of the pixel areas set, and specifying the maximum density value and the minimum density value as a maximum density value and a minimum density value which are common to the pixels in the pixel area;

if each pixel has a plurality of maximum density values and minimum density values specified corresponding to the respective areas, specifying a smallest value among the maximum density values as a local maximum value, and specifying a largest value among the minimum density values as a local minimum value;

converting the specified local minimum value and local maximum value of the pixels and the original density value of the input image in the respective pixel into a common minimum value and a common maximum value respectively, which are set separately and common to the pixels, while maintaining a relative ratio of densities for the pixels, and linearly converting original density values of the pixels in the input image simultaneously; and reconstructing the input image based on the linearly converted density values of the pixels.

5. The image density conversion method, according to claim 4, further comprising of: between the step of specifying and the step of converting, separating the local maximum value and the local minimum value of the pixels specified in the step of specifying to thereby generate a minimum density plane and a maximum density plane respectively, corresponding to the input image respectively and corresponding to a plurality of pixels included in the input image.

6. The image density conversion method, according to claim 4, comprising of, replacing the density values of the pixels which are linearly converted with the density values of corresponding pixels in the input image, to thereby reconstruct the input image.

7. An image enhancement processor, comprising:

an image plane setting unit that sets at least two image planes each of which includes a plurality of pixels of a number same as that of pixels included in an input image;

a maximum/minimum density value specifying unit that sets, for respective pixels of the input image, pixel areas each having a certain size, around the pixels respectively, the pixel areas partially overlapping each other, extracts a maximum density value and a minimum density value from a plurality of pixels in one pixel area among the pixel areas set, and specifies the maximum density value and the minimum density value as a maximum density value and a minimum density value which are common to the pixels in the pixel area;

a maximum/minimum density image generating unit that stores the specified maximum density value and the specified minimum density value of the pixels in the pixel area in the two pixel planes separately, while corresponding positions of the pixels in the two pixel planes with each other, to thereby generate a maximum density plane and a minimum density plane;

a density value replacing and setting unit that, following extraction of the maximum density value and the minimum density value in the one pixel area, sequentially extracts a maximum density value and a minimum density value in another pixel area, and if the maximum density value extracted is smaller than a maximum density value of the same pixel in an overlapping area previously specified, replaces the density value of the same pixel in the maximum density plane with the smaller density value extracted so as to set the smaller density value to be a local maximum value, and at the same time, if the minimum density value extracted is larger than the minimum density value of the same pixel in an overlapping area previously specified, replaces the density value of the same pixel in the minimum density plane with the larger density value extracted so as to set the larger density value to be a local minimum value;

a density value conversion control unit that converts the local minimum value and local maximum value, generated by replacement at the density value replacing and setting unit, of corresponding pixels in the maximum density plane and the minimum density plane and the original density value of the input image in the respective pixel at the corresponding positions thereto, into the common minimum value and the common maximum value set previously corresponding to the local minimum value and the local maximum value of the pixels, while maintaining a relative ratio of densities for the pixels, and linearly converts original density values in the input image; and an image density conversion control unit that replaces the density values of the pixels, which are linearly converted by the density value conversion control unit, with the density values of corresponding pixels of the input image to thereby reconstruct the input image.

8. An image enhancement processor, comprising:

a maximum/minimum density value specifying unit that sets, for respective pixels of the input image, pixel areas each having a certain size, around the pixels respectively, the pixel areas partially overlapping each other, extracts a maximum density value and a minimum density value from a plurality of pixels in one pixel area among the pixel areas set; and specifies and stores the maximum density value and the minimum density value as a maximum density value and a minimum density value which are common to the pixels in the pixel area;

a density value replacing and setting unit that, following extraction of the maximum density value and the minimum density value in the one pixel area, sequentially extracts a maximum density value and a minimum density value in another pixel area, and if the maximum density value extracted is smaller than a maximum density value of the same pixel in an overlapping area previously specified, replaces the density value of the same pixel with the smaller density value extracted so as to set the smaller density value to be a local maximum value, and at the same time, if the minimum density value extracted is larger than the minimum density value of the same pixel in an overlapping area previously specified, replaces the density value of the same pixel with the larger density value extracted so as to set the larger density value to be a local minimum value;

a density value conversion control unit that converts the local minimum value and the local maximum value, generated by replacement at the density value replacing and setting unit, of pixels and the original density value of the input image in the respective pixel into the common minimum value and the common maximum value set previously corresponding to the local minimum value and the local maximum value of the pixels, while maintaining a relative ratio of densities for the pixels, and linearly converts original density values of the pixels in the input image simultaneously; and an image density conversion control unit that replaces the density values of the pixels, which are linearly converted by the density value conversion control unit, with the density values of corresponding pixels of the input image to thereby reconstruct the input image.

9. An image enhancement processor, comprising:

a maximum/minimum density value extracting unit that sets, for respective pixels of an input image, pixel areas having a certain size, around the pixels respectively, the pixel areas partially overlapping each other, extracts a maximum density value and a minimum density value of pixels for each of the pixel areas set, and specifies the maximum density value and the minimum density value as a maximum density value and a minimum density value which are common to the pixels in the pixel area;

a local density value specifying unit that, if each pixel has a plurality of maximum density values and minimum density values specified corresponding to the respective areas, specifies a smallest value among the maximum density values as a local maximum value, and specifies a largest value among the minimum density values as a local minimum value;

a density value conversion setting unit that converts the specified local minimum value and local maximum value of the pixels and the original density value of the input image in the respective pixel into a common minimum value and a common maximum value respectively, which are set separately and common to the pixels, to make them common values, while maintaining a relative ratio of densities for the pixels, and linearly converts original density values of the pixels in the input image simultaneously; and an image density conversion control unit that replaces the density values of the pixels, which are linearly converted by the density value conversion control unit, with the density values of corresponding pixels of the input image to thereby reconstruct the input image.

10. An image enhancement processor, comprising:

an image plane setting means for setting at least two image planes each of which includes a plurality of pixels of a number same as that of pixels included in an input image;

a maximum/minimum density value specifying means for setting, for respective pixels of the input image, pixel areas each having a certain size, around the pixels respectively, the pixel areas partially overlapping each other, extracting a maximum density value and a minimum density value from a plurality of pixels in one pixel area among the pixel areas set, and specifying the maximum density value and the minimum density value as a maximum density value and a minimum density value which are common to the pixels in the pixel area;

a maximum/minimum density image generating means for storing the specified maximum density value and the specified minimum density value of the pixels in the pixel area in the two pixel planes separately, while corresponding positions of the pixels in the two pixel planes with each other, to thereby generate a maximum density plane and a minimum density plane;

a density value replacing and setting means for, following extraction of the maximum density value and the minimum density value in the one pixel area, sequentially extracting a maximum density value and a minimum density value in another pixel area, and if the maximum density value extracted is smaller than a maximum density value of the same pixel in an overlapping area previously specified, replacing the density value of the same pixel in the maximum density plane with the smaller density value extracted so as to set the smaller density value to be a local maximum value, and at the same time, if the minimum density value extracted is larger than the minimum density value of the same pixel in an overlapping area previously specified, replacing the density value of the same pixel in the minimum density plane with the larger density value extracted so as to set the larger density value to be a local minimum value;

a density value conversion control means for converting the local minimum value and local maximum value, generated by replacement at the density value replacing and setting means, of corresponding pixels in the maximum density plane and the minimum density plane and the original density value of the input image in the respective pixel at the corresponding positions thereto, into the common minimum value and the common maximum value set previously corresponding to the local minimum value and the local maximum value of the pixels, while maintaining a relative ratio of densities for the pixels, and linearly converting original density values in the input image; and an image density conversion control means for replacing the density values of the pixels, which are linearly converted by the density value conversion control means, with the density values of corresponding pixels of the input image to thereby reconstruct the input image.

11. An image enhancement processor, comprising:

a maximum/minimum density value specifying means for setting, for respective pixels of the input image, pixel areas each having a certain size, around the pixels respectively, the pixel areas partially overlapping each other, extracting a maximum density value and a minimum density value from a plurality of pixels in one pixel area among the pixel areas set; and specifying and storing the maximum density value and the minimum density value as a maximum density value and a minimum density value which are common to the pixels in the pixel area;

a density value replacing and setting means for, following extraction of the maximum density value and the minimum density value in the one pixel area, sequentially extracting a maximum density value and a minimum density value in another pixel area, and if the maximum density value extracted is smaller than a maximum density value of the same pixel in an overlapping area previously specified, replacing the density value of the same pixel with the smaller density value extracted so as to set the smaller density value to be a local maximum value, and at the same time, if the minimum density value extracted is larger than the minimum density value of the same pixel in an overlapping area previously specified, replacing the density value of the same pixel with the larger density value extracted so as to set the larger density value to be a local minimum value;

a density value conversion control means for converting the local minimum value and the local maximum value, generated by replacement at the density value replacing and setting means, of pixels and the original density value of the input image in the respective pixel into the common minimum value and the common maximum value set previously corresponding to the local minimum value and the local maximum value of the pixels, while maintaining a relative ratio of densities for the pixels, and linearly converting original density values of the pixels in the input image simultaneously; and an image density conversion control means for replacing the density values of the pixels, which are linearly converted by the density value conversion control means, with the density values of corresponding pixels of the input image to thereby reconstruct the input image.

12. An image enhancement processor, comprising:

a maximum/minimum density value extracting means for setting, for respective pixels of an input image, pixel areas having a certain size, around the pixels respectively, the pixel areas partially overlapping each other, extracting a maximum density value and a minimum density value of pixels for each of the pixel areas set, and specifying and storing the maximum density value and the minimum density value as a maximum density value and a minimum density value which are common to the pixels in the pixel area;

a local density value specifying means for, if each pixel has a plurality of maximum density values and minimum density values specified corresponding to the respective areas, specifying a smallest value among the maximum density values as a local maximum value, and specifying a largest value among the minimum density values as a local minimum value;

a density value conversion setting means for converting the specified local minimum value and local maximum value of the pixels and the original density value of the input image in the respective pixel into a common minimum value and a common maximum value respectively, which are set separately and common to the pixels, to make them common values, while maintaining a relative ratio of densities for the pixels, and linearly converting original density values of the pixels in the input image simultaneously; and an image density conversion control means for replacing the density values of the pixels, which are linearly converted by the density value conversion control means, with the density values of corresponding pixels of the input image to thereby reconstruct the input image.

13. A non-transitory computer-readable medium having stored thereon an image enhancement processing program which causes a computer to execute:

an image plane setting function to set at least two image planes each of which includes a plurality of pixels of a number same as that of pixels included in an input image;

a maximum/minimum density value specifying function to set, for respective pixels of the input image, pixel areas each having a certain size, around the pixels respectively, the pixel areas partially overlapping each other, extract a maximum density value and a minimum density value from a plurality of pixels in one pixel area among the pixel areas set, and specify and store the maximum density value and the minimum density value as a maximum density value and a minimum density value which are common to the pixels in the pixel area;

a maximum/minimum density image generating function to store the specified maximum density value and the specified minimum density value of the pixels in the pixel area in the two pixel planes separately, while corresponding positions of the pixels in the two pixel planes with each other, to thereby generate a maximum density plane and a minimum density plane;

a density value replacing and setting function to, following extraction of the maximum density value and the minimum density value in the one pixel area, sequentially extract a maximum density value and a minimum density value in another pixel area, and if the maximum density value extracted is smaller than a maximum density value of the same pixel in an overlapping area previously specified, replace the density value of the same pixel in the maximum density plane with the smaller density value extracted so as to set the smaller density value to be a local maximum value, and at the same time, if the minimum density value extracted is larger than the minimum density value of the same pixel in an overlapping area previously specified, replace the density value of the same pixel in the minimum density plane with the larger density value extracted so as to set the larger density value to be a local minimum value;

a density value conversion control function to convert the local minimum value and the local maximum value, generated by replacement with the density value replacing and setting function, of corresponding pixels in the maximum density plane and the minimum density plane and the original density value of the input image in the respective pixel at the corresponding positions thereto, into the common minimum value and the common maximum value set previously corresponding to the local minimum value and the local maximum value of the pixels, while maintaining a relative ratio of densities for the pixels, and linearly convert original density values of the pixels in the input image simultaneously; and an image density conversion control function to replace the density values of the pixels, which are linearly converted by the density value conversion control function, with the density values of corresponding pixels of the input image to thereby reconstruct the input image.

14. A non-transitory computer-readable medium having stored thereon an image enhancement processing program which causes a computer to execute:

a maximum/minimum density value specifying function to set, for respective pixels of the input image, pixel areas each having a certain size, around the pixels respectively, the pixel areas partially overlapping each other, extract a maximum density value and a minimum density value from a plurality of pixels in one pixel area among the pixel areas set, and specify and store the maximum density value and the minimum density value as a maximum density value and a minimum density value which are common to the pixels in the pixel area;

a density value replacing and setting function to, following extraction of the maximum density value and the minimum density value in the one pixel area, sequentially extract a maximum density value and a minimum density value in another pixel area, and if the maximum density value extracted is smaller than a maximum density value of the same pixel in an overlapping area previously specified, replace the density value of the same pixel with the smaller density value extracted so as to set the smaller density value to be a local maximum value, and at the same time, if the minimum density value extracted is larger than the minimum density value of the same pixel in an overlapping area previously specified, replace the density value of the same pixel with the larger density value extracted so as to set the larger density value to be a local minimum value;

a density value conversion control function to convert the local minimum value and the local maximum value, generated by replacement with the density value replacing and setting function, of the pixels and the original density value of the input image in the respective pixel into the common minimum value and the common maximum value set previously corresponding to the local minimum value and the local maximum value of the pixels, while maintaining a relative ratio of densities for the pixels, and linearly convert original density values of the pixels in the input image simultaneously; and an image density conversion control function to replace the density values of the pixels, which are linearly converted by the density value conversion control function, with the density values of corresponding pixels of the input image to thereby reconstruct the input image.

15. A non-transitory computer-readable medium having stored thereon an image enhancement processing program which causes a computer to execute:

a maximum/minimum density value extracting function to set, for respective pixels of the input image, pixel areas each having a certain size, around the pixels respectively, the pixel areas partially overlapping each other, extract a maximum density value and a minimum density value from a plurality of pixels in one pixel area among the pixel areas set, and specify and store the maximum density value and the minimum density value as a maximum density value and a minimum density value which are common to the pixels in the pixel area;

a local density value specifying function to, if each pixel has a plurality of maximum density values and minimum density values specified corresponding to the respective areas, specify a smallest value among the maximum density values as a local maximum value, and specify a largest value among the minimum density values as a local minimum value;

a density value conversion setting function to convert the specified local minimum value and local maximum value of the respective pixels and the original density value of the input image in the respective pixel into a common minimum value and a common maximum value, which are set separately and common to the pixels, to thereby make them common values, while maintaining a relative ratio of densities for the pixels, and linearly convert original density values of the pixels in the input image simultaneously; and an image density conversion control function to replace the density values of the pixels, which are linearly converted by the density value conversion control function, with the density values of corresponding pixels of the input image to thereby reconstruct the input image.

* * * * *